United States Patent [19]

Falzarano et al.

[11] Patent Number: 4,608,498
[45] Date of Patent: Aug. 26, 1986

[54] LOAD CONTROL CIRCUIT WITH DIFFERENT INPUT VOLTAGES

[75] Inventors: Lorenzo Falzarano, Belmont; Carl Hewson, Marshfield, both of Mass.

[73] Assignee: Brunswick Mfg. Co., North Quincy, Mass.

[21] Appl. No.: 593,865

[22] Filed: Mar. 27, 1984

[51] Int. Cl.$^4$ ............................................. H02M 1/10
[52] U.S. Cl. ........................................ 307/22; 307/72; 307/130; 323/299; 363/79; 363/142; 363/143
[58] Field of Search .................. 307/22, 29, 26, 2, 64, 307/125, 128, 23, 28, 36, 37, 80, 71, 72, 86, 75, 43, 48, 56, 66, 130, 151; 363/142, 143, 75, 79, 80, 82; 323/299, 301, 303

[56] References Cited

U.S. PATENT DOCUMENTS

| | | | |
|---|---|---|---|
| 2,997,631 | 8/1961 | Moakler | 307/64 |
| 3,287,623 | 11/1966 | Valancius | 307/22 |
| 3,419,790 | 12/1968 | Gahn | 323/301 |
| 3,755,686 | 8/1973 | Woods | 307/29 X |
| 3,886,429 | 5/1975 | Maillard et al. | 307/23 X |
| 4,016,458 | 4/1977 | Everhart | 363/142 X |
| 4,185,315 | 1/1980 | Miller | 307/80 X |
| 4,209,710 | 6/1980 | Quarton | 307/66 |

*Primary Examiner*—A. D. Pellinen
*Assistant Examiner*—T. DeBoer
*Attorney, Agent, or Firm*—Wolf, Greenfield & Sacks

[57] ABSTRACT

A load control circuit having an input terminal adapted to receive any one of a number of different input voltage signals including signals of at least first and second type. These signals may be, respectively, DC and AC input signals. Control circuits are provided for operation of the load from the input voltage signal. This control circuit includes at least first part responsive only to said input voltage signal being of first type for coupling said signal of first type to the load, and a second part responsive only to the input voltage signal being of second type for coupling the signal of second type to the load.

6 Claims, 2 Drawing Figures

LOAD CONTROL CIRCUIT WITH DIFFERENT INPUT VOLTAGES

BACKGROUND OF THE INVENTION

The present invention relates in general to a load management circuit which is adapted to receive input voltages of different type, such as both AC and DC input voltages, and which has the capability of essentially automatically directing these voltages for operation of the load.

Load control circuitry exists in which a load is adapted to be driven from two different respective input signals or voltages. It is common in such an arrangement to provide some type of a manual switch which may, for example, be a two-position switch. In one position, only a first voltage can be coupled to the load, while in a second position, a second different voltage can be coupled to the load. In existing circuitry, there is no relatively simple way of automatically coupling the proper voltage to the load.

In accordance with one use of load control circuitry, reference may be made to a resuscitator apparatus which employs a DC motor and associated controls. One problem in operating this resuscitator apparatus, particularly in the field, is that one particular voltage may not always be available and thus it is desired to provide a circuit as now in accordance with the present invention in which the circuit essentially automatically detects the type of voltage input and operates the load accordingly. This operation of the load occurs essentially in the same controlled manner regardless of the input voltage type and to some extent regardless of the input voltage amplitude.

Accordingly, it is an object of the present invention to provide an improved load management circuit which includes detection means for determining the nature of a particular voltage that is applied at the input for in turn applying this voltage in the proper manner to the load.

Another object of the present invention is to provide an improved automatically operated load control circuit that is adapted to receive input voltages of different type and even different magnitude such as both input AC and DC voltages and for properly directing these applied voltages to the proper output load device.

A further object of the present invention is to provide a load management control circuit in which there is essentially a single input at which voltages of different type may be applied and for in turn ultimately controlling an output load wherein this control occurs in an automatic manner so that, for example, a DC input voltage is coupled to the load in one case and an AC input voltage is coupled to the load in another case.

SUMMARY OF THE INVENTION

To accomplish the foregoing and other objects, features and advantages of the invention, there is provided a load control circuit which comprises an input terminal means which is adapted to receive any one of a number of different input voltage signals including signals of at least first and second type. There is also provided load means. The voltages of first and second type may be, respectively, DC and AC voltages. The load control circuit of the invention also comprises control circuit means for controlling operation of the load means from the input voltage signal. This control circuit means includes at least first means responsive only to said input voltage signal of a first type for coupling this signal of first type to the load. Also included is second means responsive only to the input voltage signal being of second type for enabling this signal of second type to activate the load. The first means may include an electrical energizing means such as a relay having associated therewith an input delay circuit. Similarly, the second means may include an electrical energizing means and in the disclosed embodiment, the second means includes actually a pair of relays, one of which has an input delay circuit associated therewith. In this disclosed embodiment, one of the relays is adapted to receive a signal of higher AC voltage while the other relay receives a signal of lower AC voltage. The relay of lower AC voltage is the one having associated therewith, an input delay circuit including rectifier means. There may also be provided in accordance with the invention, a transformer for intercoupling from the input to the load. This transformer preferably has a pair of primary windings. When the higher AC voltage is applied, the control operates so as to couple both primary windings in series. When the lower AC voltage which may be 120 volts, is applied at the input terminals, then the control circuitry operates so as to couple the primary windings in parallel. The AC output to the load is taken at the secondary of the transformer and in this connection, there may also be two secondary windings which are preferably connected in parallel and in turn couple to the load.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
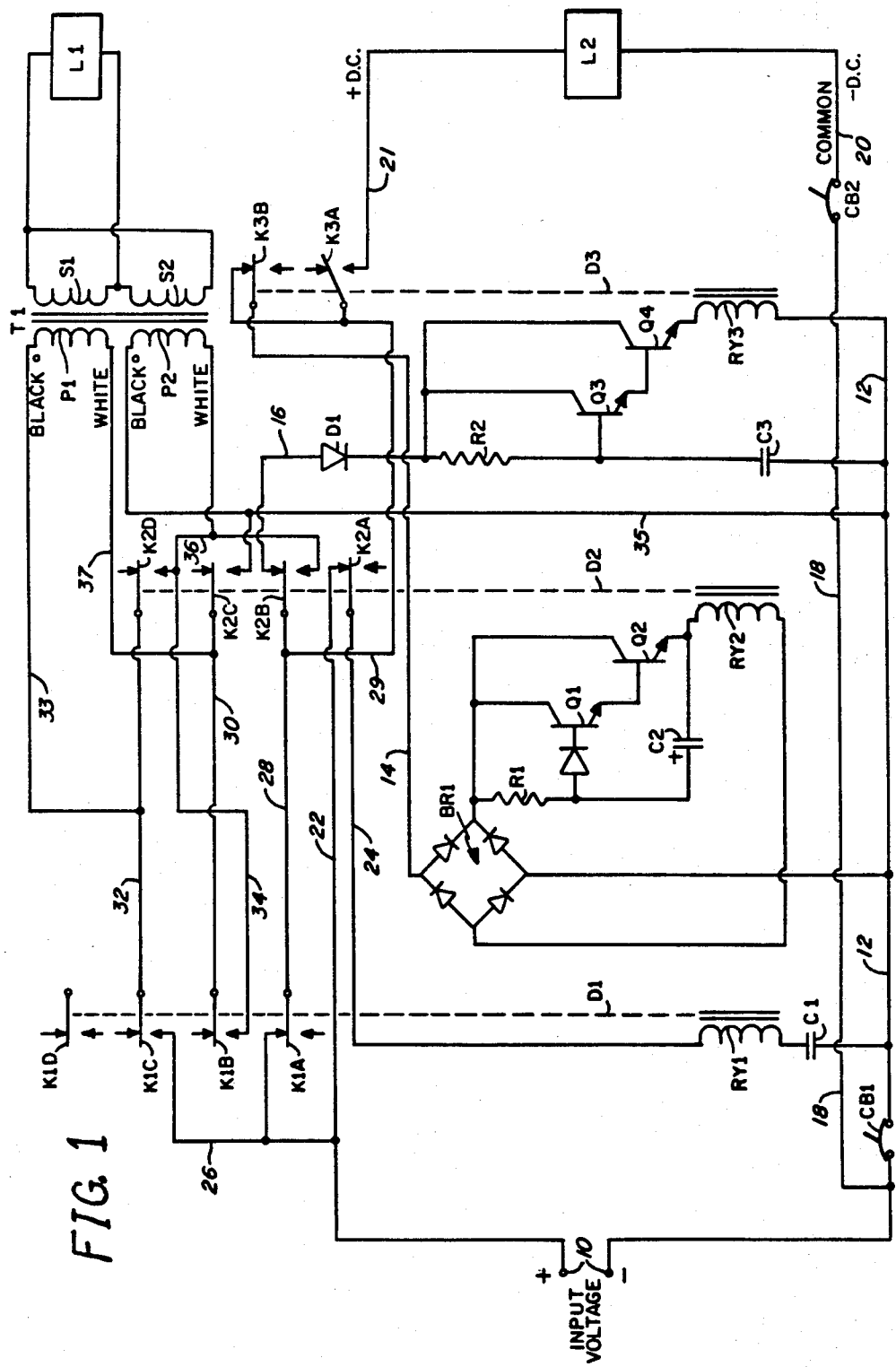
FIG. 1 is a circuit diagram of a preferred embodiment of the present invention adapted to operate an output load (which may be a DC motor load) from a single input and in which the single input may receive either AC or DC voltages such as of illustrative magnitude of 12 volts DC or 24 volts DC along with 120 volts AC or 240 volts AC.

Referring now to the drawing, there is shown a circuit diagram of a preferred embodiment of the present invention. In this embodiment of the invention, the circuit is adapted to accommodate both AC and DC input voltages at the input terminals 10. These voltages may, for example, be 12 volts DC, 24 volts DC, and 120 volts AC, and 240 volts AC. In alternate embodiments of the invention, fewer or greater number of different inputs may be incorporated. In a simplified version of the present invention, the input may be adapted to receive a single DC voltage and a single AC voltage.

Figure 2:
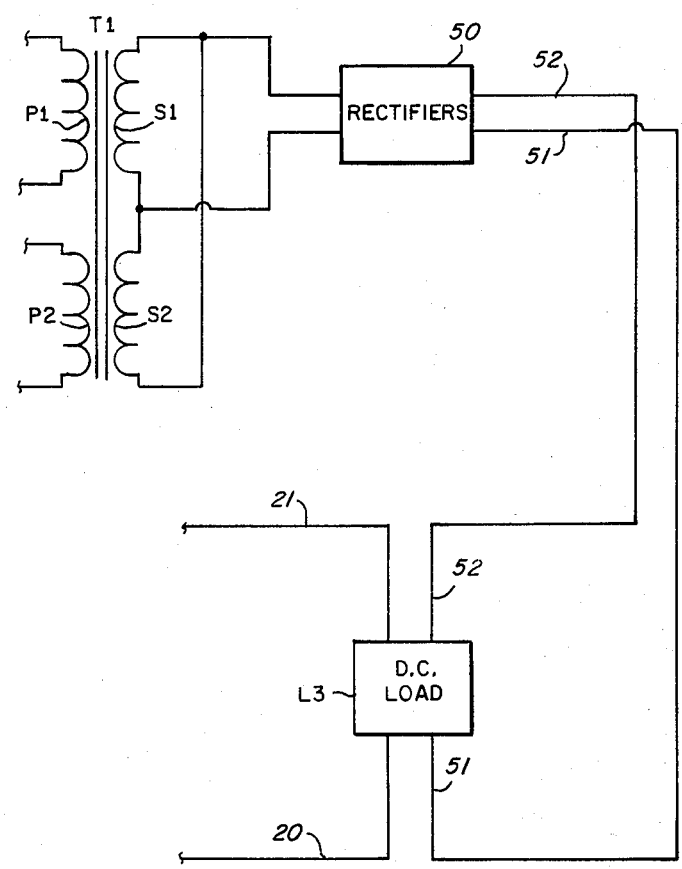
FIG. 2 shows a fragmentary view of the circuitry illustrating the preferred interconnection at the output to a single load which is illustrated as a DC load but also may be of other type.

The circuit of the present invention as indicated previously, is adapted to detect the type of input voltage and possibly also the magnitude thereof, so as to in turn operate an output load which is to be excited. From the standpoint of the load, it operates equally effectively from any one of the inputs. In the drawing, the load means is illustrated by loads L1 and L2. Although the loads L1 and L2 are illustrated herein, in an actual version of the present invention, as illustrated in FIG. 2, the output of the AC section of the circuit actually couples to the commmon DC load for operation thereof. Thus, the output load may be considered in essence as a single load operable from either AC or DC input voltage signals.

It is noted in accordance with the present invention that the coupling to the load occurs automatically, primarily by means of detection of the type of input that is applied at the input terminals 10. This eliminates the need for any type of manually operated switches for altering the circuitry and also eliminates the problems associated with applying a predetermined input when the switch is in its wrong position.

Now, with more specific reference to the components shown in the drawing, there are provided three relays, each having associated therewith, multiple contacts. There is a 240 volt relay RY1 and also a 120 volt AC relay RY2. The relay RY1 is an AC operated relay and in this connection, it is noted that there is a capacitor C1 in series therewith coupling to common line 12 of the circuit. The relay RY2 has a 120 volt DC coil and has associated therewith an input delay circuit and a full wave rectifier bridge BR1. The delay circuit is comprised of resistor R1, capacitor C2 and transistors Q1 and Q2. The transistors Q1 and Q2 are intercoupled as a Darlington pair. The two collectors of transistors Q1 and Q2 are tied together and connect to one side of resistor R1. The other side of resistor R1 connects to the capacitor C2 and also by way of a diode to the base of transistor Q1. The emitter of transistor Q1 in turn connects to the base of the second transistor Q2. The emitter of transistor Q2 in turn couples to the opposite side of the capacitor C2 and also to the relay coil of relay RY2.

In connection with the bridge circuit BR1, it is noted that this itself is of conventional design providing full wave bridge rectification. The input to the bridge circuit is at line 14 with the opposite leg of the bridge being coupled to the line 12. The output of the bridge circuit couples on one side to the resistor R1 and the collectors of transistors Q1 and Q2, and on the other side to the bottom end of the coil of relay RY2.

The relay RY3 is the DC responsive relay. This may be a relay having a 12 volt DC coil. The lower end of the coil as illustrated in the drawing connects to the common line 12. Associated with the DC relay RY3 is also a delay circuit comprised of diode D1, resistor R2, and capacitor C3 along with transistors Q3 and Q4. The diode D1, resistor R2, and capacitor C3 are connected in series as illustrated. The diode D1 is fed from input line 16 shown in the drawing. The transistor Q3 has its base connected to the junction between resistor R2 and capacitor C3 and has its collector tied in common with the collector of transistor Q4 and also the junction between diode D1 and resistor R2. The emitter of transistor Q3 couples into the base of transistor Q4 and the emitter of transistor Q4 in turn connects to the top side of the relay coil of the DC relay RY3. The transistors Q3 and Q4 form a standard Darlington pair.

Also illustrated in the drawing is a second common line 18, which connects from one of the input terminals 10 to the output common line 20 which in turn connects to the load L2. It is noted that there is a first circuit breaker CB1 in the line 12 and also a second circuit breaker CB2 intercoupling the lines 18 and 20.

As indicated previously, each of the relays has associated therewith, sets of contacts. Thus, for example, the relay RY1 has contacts K1A, K1B, K1C, and K1D. The contact K1D is unused in this embodiment of the invention. Similarly, the relay RY2 has associated therewith, contacts K2A, K2B, K2C, and K2D, all of which are employed in this embodiment of the invention. Lastly, the relay coil RY3 has associated therewith, contacts K3A and K3B. In the drawing, the dashed lines D1, D2, and D3, illustrate the respective control between the relays and their contacts. Also, in the drawing, each of the relay contacts are shown in their de-energized position. When any one of the relays becomes energized, then the movable member of each contact moves to the opposite position.

The drawing also shows the transformer T1 which is comprised of a pair of primary windings P1 and P2, and a pair of secondary windings S1 and S2. In the embodiment illustrated, the secondary windings S1 and S2 are connected in parallel and couple to the load L1. The primary windings P1 and P2 are adapted in accordance with the control circuitry to be either connected in series or parallel depending upon whether the input at terminals 10 is 120 volt AC or 240 volt AC. A further discussion of this operation follows.

With regard to the connections of the contacts that are illustrated, it is noted that the positive input terminal 10 couples by way of line 22 directly to one of the fixed members of contact K2A. The movable member of contact K2A couples by way of line 24 to the top side of relay RY1. Coupled from line 22 is also a further line 26 which connects to fixed members of contacts K1A and K1C. The movable member of contact K1A couples by way of line 28 to the movable member of contact K2B. Similarly, the movable member of contact K1B couples by way of line 30 to the movable member of contact K2C. Likewise, the movable member of contact K1C couples by way of line 32 to the movable member of contact K2D. A line 34 couples the fixed member of contact K1B to the fixed member of contact K2D. A line 36 couples more forward to the fixed member of contact K2B.

With regard to the operation of the circuit, it may first be assumed that a DC voltage is applied at the input terminals 10. This may be either, for example, 12 volts DC or 24 volts DC. When this voltage is applied at the terminals 10, at the time that it is applied, none of the relays RY1, RY2, or RY3 are energized and thus the contacts are initially shown as in the drawing. The positive side of terminal 10 couples by way of line 22 and contact K2A to line 24. Line 24 in turn connects to the relay RY1. However, this is a 240 volt coil relay and thus upon application of a relatively low DC voltage, there is no energization of the relay RY1. The voltage at terminal 10 also couples by way of line 26 to contacts K1A and K1C. The contact K1C is open and thus there is no further connection through contact K1C. However, the contact K1A is closed and thus the voltage on line 26 couples by way of contact K1A to line 28 and in turn, by way of line 16 to the delay circuit which includes diode D1 and resistor R2. It is also noted that the line 28 couples by way of line 29 to contacts K3A and K3B. The contact K3A is open at this time and the contact K3B is closed, providing a circuit path to line 14 and the bridge circuit BR1. However, again, the relay RY2 associated with the bridge BR1 and the associated delay circuit has a 120 volt coil and thus there is no energization of the relay RY2 from the circuit path including line 14.

Accordingly, upon application of a DC voltage at the terminals 10, the path of energization is from terminal 10, through line 26, to contact K1A, through line 28, to contact K2B, and by way of line 16 to the delay circuit associated with relay RY3. After a short predetermined delay, the relay RY3 is energized and the contacts K3A and K3B move to their energized position which is opposite to that illustrated in the drawing. The contact K3A which was previously open then closes, and the applied voltage by way of contact K1A and lines 28 and 29 now couples by way of contact K3A directly to the output line 21 in turn coupling to the load L2. The common lines 18 and 20 complete the voltage transfer to the load L2.

Along with energization of the contact K3A, there is also movement of the contact K3B so as to essentially open this contact and thus interrupt any applied voltage to line 14. This is an extra safety feature which assures tnat the relay RY2 will not be energized when a low DC voltage is applied at the input to the circuit.

With regard to the energization of relay RY3, it is furthermore noted that although a circuit path appears to remain to the relay RY1, it is noted that this is AC coupled by means of the capacitor C1 and thus any DC voltage is blocked. This means that when relay RY3 is energized, neither of the other relays RY1 nor RY2 can become energized.

Furthermore, the circuit path for this aforementioned DC operation is such that any input DC voltage that is applied at the input terminals is essentially transposed to the output at the load L2. If this voltage is 12 volts DC at the input, then the output at lines 20 an 21 is likewise 12 volts DC. If the input is at 24 volts DC, then the output at lines 20 and 21 is likewise 24 volts DC at the load L2.

It may next be assumed that an AC voltage is applied such as 120 volts AC. This voltage is also applied at the input terminals 10. The circuit of the present invention is adapted to detect this voltage application and couple the appropriate voltage to the output load L1. Voltages are coupled to the load L2 only when the relay K3 is energized by way of the contact K3A. For the example of the application of the 120 volts AC, it is again assumed that initially all of the relays are de-energized and thus have their contacts in the position as illustrated in the drawing. The AC voltage couples by way of line 22 and contact K2A to line 24 and from there to the relay RY1. However, this relay coil is for a 240 volt signal and thus the relay RY1 does not become energized or is subject to energization very slowly. What occurs is that relay RY2 becomes energized relatively quickly. In this connection, it is noted that there is a circuit path from line 26 through relay contact K1A, through lines 28 and 29 to contact K3B and from there to line 14. The AC signal is thus coupled to the full wave bridge BR1 which provides for full wave rectification of the signal, coupling the signal then to the delay circuit which is comprised of resistor R1, capacitor C2, and transistors Q1 and Q2. The delay is determined primarily by the time constant associated with the capacitor C2 and the resistor R1. After a short predetermined delay, the relay RY2 has its coil energized. This energization of the relay RY2 would occur long before any possible energization of the relay RY1.

When the relay RY2 is energized, then the contacts K2A-K2D change their position. First, the contact K2A opens thus opening the circuit path from line 22 to line 24. This assures that the relay RY1 will not become energized. With regard to the contact K2B, the change in its position opens the path between lines 16 and 28 and thus any voltage coupled to the relay RY3 will be interrupted. The delay of the delay circuit associated with relay RY3 is longer than the delay associated with the delay circuit associated with relay RY2. Thus, when relay RY2 is energized, contacts are moved so that relays RY1 and RY3 have their energization path opened. The other contacts associated with relay RY2 operate so as to place the primary windings P1 and P2 of transformer T1 in a parallel arrangement for 120 volt AC operation. The circuit path is as follows: From the top of primary P1 by way of line 33, there is a path through contact K2D to line 36 and the bottom side of primary P2. The top or black side of primary P2 couples by way of line 35 to the common line 12. The bottom or white side of the primary winding P1 is coupled by way of line 37 through contact K2C to line 35. This operation of the contacts essentially places the primary windings P1 and P2 in parallel to each other with the dot notations in opposition.

Now, for 240 volt AC operation, it can again be assumed that initially none of the relays are energized. When the 240 volt AC signal is applied at the terminals 10, this signal is coupled by way of line 22 and contact K2A to the line 24 and from there to the relay RY1. This causes immediate energization of the relay RY1 because there is no delay associated with this relay as with the other relays RY2 and RY3. There is also an additional circuit path from the input terminals 10 by way of contact K1A and lines 28 and 29 to contact K3B and from there to line 14 and the bridge circuit BR1. Thus, there is the application of AC voltage to the bridge circuit but the delay associated with relay RY2 prevents the signal from causing energization of the relay RY2 for some predetermined delay period. However, before this delay period can terminate, the relay RY1 has already been energized. When this occurs, then the contact K1A opens and the aforementioned ciruit path from the input terminal 10 to line 28 is open at the contact K1A. This action prevents any coupling of further AC power to the bridge circuit BR1 and thus the relay RY2 never energizes. It is also noted that the opening of contact K1A also interrupts the path from line 28 through contact K1B to line 16. This thus means that there cannot be any energization of the relay RY3. This is primarily because there is again a delay associated with relay RY3 and the 240 volt AC signal causes immediate energization of relay RY1. The delay associated with relay RY3 will prevent any energization of this relay and soon the contact K1A opens to prevent any further feeding of energy to either of the delay circuits associated with relays RY2 or RY3.

Thus, the contact K1A associated with relay RY1 is primarily instrumental in preventing any further operation of the other relays. The contact K1B when it closes, completes a circuit path between lines 30 and 34. The contact K1C completes a circuit path from line 26 to line 32. It must also be realized that the contacts associated with relay RY2 are in the position illustrated because this relay is de-energized. The net effect is that the primary windings P1 and P2 are connected in series which is the desired arrangement for 240 volt operation so that the voltage at the input is coupled also at 240 volts AC at the output load L1. In this connection, the circuit path is as follows: The signal at the input terminal 10 couples to line 26 and by way of contact K1C to lines 32 and 33 to the top side of primary P1. The bottom side of primary P1 couples by way of line 37 and lines 30, 34, and 36 to the bottom side of primary P2. The top side of primary P2 is coupled to the common line and thus, it can be seen that the bottom sides of both of the primaries P1 and P2 are connected together thus providing a series arrangement in which the two primary windings P1 and P2 are connected in series.

Although in FIG. 1 we have illustrated loads L1 and L2, in accordance with the preferred embodiment of the invention, the circuit that is described is adapted to ultimately operate a single load. This is shown in FIG. 2 as the single load L3. In this connection, note the previously referred to lines 20 and 21 coupling to the DC load L3. Also note the secondary windings S1 and S2 of the transformer and the associated output rectifiers 50. It is also noted that at the output of the rectifiers there are lines 51 and 52 that also couple essentially in parallel to the load L3. Thus, for any AC input at the input terminals 10, this is automatically detected and although no signal occurs to the DC load on lines 20 and 21, there is a signal through the AC portion of the circuit to the rectifiers 50 and from there to lines 51 and 52 to operate DC load L3. Thus, the load L3, although it need not be a DC load, is described for the purpose of explanation as a DC load that can be operated essentially either from a direct DC path or by way of an AC path with the voltage being rectified to then operate the DC load. The DC load that is illustrated may be a DC motor and associated controls. In this regard, the controls for the DC motor are what is actually operated by the voltage signals on either lines 20 and 21 or lines 51 and 52.

Thus, it can be seen that with the circuit described in FIG. 1, a number of different inputs can be used and these inputs are detected and properly processed so as to effectively energize essentially a single output load.

Having described one embodiment of the present invention, it should now be apparent to those skilled in the art that numerous other embodiments are contemplated as falling within the scope of this invention.

What is claimed is:

1. A control circuit controlling operation of a DC load and comprising;
   input terminal means that receive any one of a plurality of different input voltage signals including AC or DC signals,
   control circuit means controlling operation of said DC load from said input voltage signal and including first means responsive only to said input DC voltage signal to control said load, second means responsive only to said input AC voltage signal for controlling said load,
   said first means comprising a first electrical energizing means and said second means comprising a second electrical energizing means,
   a transformer and means coupling the transformer to the input terminal means,
   a rectifier coupled between the transformer and load,
   means responsive to application of a DC input signal to energize said first electrical energizing means only to in turn energize said DC load directly,
   and means responsive to application of an AC input signal to energize said second electrical energizing means only to in turn couple the AC signal via the transformer and rectifier to the DC load,
   said means responsive to application of the DC and AC input signals being operated on a mutually exclusive basis,
   said second means including one and another electrical energizing means, said one thereof having a delay means at the input thereof,
   said one and another electrical energizing means being operated at different AC voltages.

2. A load control circuit as set forth in claim 1 wherein said first means includes an electrical energizing means and an associated delay means at the input thereof.

3. A load control circuit as set forth in claim 1 wherein said transformer has first and second primary windings connected in series when the one energizing means is operated and connected in parallel when the another energizing means is operated.

4. A load control circuit as set forth in claim 1 wherein each energizing means comprises a relay with associated contacts.

5. A load control circuit as set forth in claim 4 wherein each delay means comprises an R-C circuit and associated transistor means.

6. A load control circuit as set forth in claim 5 wherein said transistor means comprises a Darlington pair.

* * * * *